(12) United States Patent
Duthaler et al.

(10) Patent No.: US 6,312,304 B1
(45) Date of Patent: Nov. 6, 2001

(54) ASSEMBLY OF MICROENCAPSULATED ELECTRONIC DISPLAYS

(75) Inventors: Gregg M. Duthaler, Brookline; Peter T. Kazlas, Sudbury; Paul S. Drzaic, Lexington, all of MA (US)

(73) Assignee: E Ink Corporation, Cambridge, MA (US)

(*) Notice: Subject to any disclaimer, the term of this patent is extended or adjusted under 35 U.S.C. 154(b) by 0 days.

(21) Appl. No.: 09/461,463

(22) Filed: Dec. 14, 1999

Related U.S. Application Data

(63) Continuation-in-part of application No. 09/338,412, filed on Jun. 22, 1999, now abandoned, and a continuation-in-part of application No. 09/289,036, filed on Apr. 9, 1999
(60) Provisional application No. 60/112,330.

(51) Int. Cl.[7] ............................................. G09G 3/34
(52) U.S. Cl. .................................. 445/24; 313/506
(58) Field of Search ....................... 445/24, 25; 313/504, 313/506

(56) References Cited

U.S. PATENT DOCUMENTS

| | | |
|---|---|---|
| 3,036,388 | 10/1962 | Tate . |
| 3,384,488 | 5/1968 | Tulagin et al. . |
| 3,612,758 | 10/1971 | Evans et al. . |
| 3,670,323 | 6/1972 | Sobel et al. . |
| 3,767,392 | 10/1973 | Ota . |
| 3,792,308 | 2/1974 | Ota . |
| 3,806,893 | 4/1974 | Ohnishi et al. . |
| 3,850,627 | 11/1974 | Wells et al. . |
| 3,972,040 | 7/1976 | Hilsum et al. . |
| 4,041,481 | 8/1977 | Sato . |
| 4,045,327 | 8/1977 | Noma et al. . |
| 4,068,927 | 1/1978 | White . |
| 4,071,430 | 1/1978 | Liebert . |
| 4,088,395 | 5/1978 | Giglia . |
| 4,123,346 | 10/1978 | Ploix . |
| 4,149,149 | 4/1979 | Miki et al. . |
| 4,203,106 | 5/1980 | Dalisa et al. . |
| 4,218,302 | 8/1980 | Dalisa et al. . |
| 4,261,653 | 4/1981 | Goodrich . |
| 4,298,448 | 11/1981 | Müller et al. . |
| 4,305,807 | 12/1981 | Somlyody . |
| 4,311,361 | 1/1982 | Somlyody . |
| 4,324,456 | 4/1982 | Dalisa . |
| 4,390,403 | 6/1983 | Batchelder . |
| 4,418,346 | 11/1983 | Batchelder . |

(List continued on next page.)

FOREIGN PATENT DOCUMENTS

| | | |
|---|---|---|
| 44 31 441 C1 | 2/1996 | (DE) . |
| 195 00 694 A1 | 8/1996 | (DE) . |

(List continued on next page.)

OTHER PUBLICATIONS

Platt, "Digital Ink," *Wired*, May 1997, pp. 162–211.
Ackerman, J., "E Ink of Cambridge Gets Start–Up Funding," *Boston Globe*, Dec. 24, 1997.
Blazo, "High Resolution Electrophoretic Display with Photoconductor Addressing," *SID 82 Digest*, 1982, pp. 92–93.
Bohnke et al., "Polymer–Based Solid Electrochronic Cell for Matrix–Addressable Display Devices," *J. Electrochem Soc.*, vol. 138, No. 12, Dec. 1991, pp. 3612–3617.

(List continued on next page.)

*Primary Examiner*—Kenneth J. Ramsey
(74) *Attorney, Agent, or Firm*—Testa, Hurwitz & Thibeault, LLP

(57) ABSTRACT

An electro-optical device is manufactured by separately manufacturing an electronic component and an optical component and subsequently integrating the electronic and the optical components. Separate fabrication of the two components allows each component to be manufactured using processes which optimize its properties.

34 Claims, 10 Drawing Sheets

U.S. PATENT DOCUMENTS

| | | |
|---|---|---|
| 4,430,648 | 2/1984 | Togashi et al. . |
| 4,439,507 | 3/1984 | Pan et al. . |
| 4,450,440 | 5/1984 | White . |
| 4,522,472 | 6/1985 | Liebert et al. . |
| 4,598,960 | 7/1986 | DiSanto et al. . |
| 4,643,528 | 2/1987 | Bell, Jr. . |
| 4,648,956 | 3/1987 | Marshall et al. . |
| 4,655,897 | 4/1987 | DiSanto et al. . |
| 4,732,830 | 3/1988 | DiSanto et al. . |
| 4,741,604 | 5/1988 | Kornfeld . |
| 4,742,345 | 5/1988 | DiSanto et al. . |
| 4,746,917 | 5/1988 | Di Santo et al. . |
| 4,833,464 | 5/1989 | Di Santo et al. . |
| 4,846,931 | 7/1989 | Gmitter et al. . |
| 4,850,919 | 7/1989 | DiSanto et al. . |
| 4,883,561 | 11/1989 | Gmitter et al. . |
| 4,892,607 | 1/1990 | DiSanto et al. . |
| 4,931,019 | 6/1990 | Park . |
| 4,947,159 | 8/1990 | Di Santo et al. . |
| 5,009,490 | 4/1991 | Kouno et al. . |
| 5,028,841 | 7/1991 | DiSanto et al. . |
| 5,041,824 | 8/1991 | DiSanto et al. . |
| 5,053,763 | 10/1991 | DiSanto et al. . |
| 5,066,105 | 11/1991 | Yoshimoto et al. . |
| 5,066,946 | 11/1991 | Disanto et al. . |
| 5,070,326 | 12/1991 | Yoshimoto et al. . |
| 5,077,157 | 12/1991 | DiSanto et al. . |
| 5,105,185 | 4/1992 | Nakanowatari et al. . |
| 5,128,226 | 7/1992 | Hung . |
| 5,128,785 | 7/1992 | Yoshimoto et al. . |
| 5,161,007 | 11/1992 | Takanashi et al. . |
| 5,174,882 | 12/1992 | DiSanto et al. . |
| 5,177,476 | 1/1993 | DiSanto et al. . |
| 5,187,609 | 2/1993 | DiSanto et al. . |
| 5,194,852 | 3/1993 | More et al. . |
| 5,216,416 | 6/1993 | DiSanto et al. . |
| 5,220,316 | 6/1993 | Kazan . |
| 5,223,115 | 6/1993 | DiSanto et al. . |
| 5,223,823 | 6/1993 | DiSanto et al. . |
| 5,247,290 | 9/1993 | DiSanto et al. . |
| 5,250,932 | 10/1993 | Yoshimoto et al. . |
| 5,250,938 | 10/1993 | DiSanto et al. . |
| 5,254,981 | 10/1993 | Disanto et al. . |
| 5,266,937 | 11/1993 | DiSanto et al. . |
| 5,270,843 | 12/1993 | Wang . |
| 5,276,438 | 1/1994 | DiSanto et al. . |
| 5,279,511 | 1/1994 | DiSanto et al. . |
| 5,279,694 | 1/1994 | DiSanto et al. . |
| 5,293,528 | 3/1994 | DiSanto et al. . |
| 5,296,974 | 3/1994 | Tada et al. . |
| 5,302,235 | 4/1994 | DiSanto et al. . |
| 5,303,073 | 4/1994 | Shirota et al. . |
| 5,304,439 | 4/1994 | DiSanto et al. . |
| 5,315,312 | 5/1994 | DiSanto et al. . |
| 5,345,251 | 9/1994 | DiSanto et al. . |
| 5,359,346 | 10/1994 | DiSanto et al. . |
| 5,362,671 | 11/1994 | Zavracky et al. . |
| 5,383,008 | 1/1995 | Sheridon . |
| 5,389,945 | 2/1995 | Sheridon . |
| 5,402,145 | 3/1995 | DiSanto et al. . |
| 5,412,398 | 5/1995 | DiSanto et al. . |
| 5,460,688 | 10/1995 | DiSanto et al. . |
| 5,463,492 | 10/1995 | Check, III . |
| 5,467,107 | 11/1995 | DiSanto et al. . |
| 5,499,038 | 3/1996 | DiSanto et al. . |
| 5,508,720 | 4/1996 | DiSanto et al. . |
| 5,545,291 | 8/1996 | Smith et al. . |
| 5,561,443 | 10/1996 | DiSanto et al. . |
| 5,565,885 | 10/1996 | Tamanoi . |
| 5,573,711 | 11/1996 | Hou et al. . |
| 5,575,554 | 11/1996 | Guritz . |
| 5,583,675 | 12/1996 | Yamada et al. . |
| 5,602,572 | 2/1997 | Rylander . |
| 5,609,978 | 3/1997 | Giorgianni et al. . |
| 5,614,340 | 3/1997 | Bugner et al. . |
| 5,619,307 | 4/1997 | Machino et al. . |
| 5,623,585 | 4/1997 | Matias et al. . |
| 5,625,460 | 4/1997 | Tai . |
| 5,627,561 | 5/1997 | Laspina et al. . |
| 5,638,103 | 6/1997 | Obata et al. . |
| 5,648,801 | 7/1997 | Beardsley et al. . |
| 5,650,247 | 7/1997 | Taniguchi et al. . |
| 5,650,872 | 7/1997 | Saxe et al. . |
| 5,672,381 | 9/1997 | Rajan . |
| 5,675,719 | 10/1997 | Matias et al. . |
| 5,684,501 | 11/1997 | Knapp et al. . |
| 5,686,383 | 11/1997 | Long et al. . |
| 5,689,282 | 11/1997 | Wolfs et al. . |
| 5,699,102 | 12/1997 | Ng et al. . |
| 5,705,826 * | 1/1998 | Atatani et al. ......................... 257/40 |
| 5,707,738 | 1/1998 | Hou . |
| 5,714,051 | 2/1998 | Van Leth et al. . |
| 5,715,511 | 2/1998 | Aslam et al. . |
| 5,715,514 | 2/1998 | Williams et al. . |
| 5,717,515 | 2/1998 | Sheridon . |
| 5,718,996 | 2/1998 | Iijima et al. . |
| 5,721,042 | 2/1998 | Iijima et al. . |
| 5,722,781 | 3/1998 | Yamaguchi . |
| 5,725,935 | 3/1998 | Rajan . |
| 5,729,663 | 3/1998 | Lin et al. . |
| 5,731,116 | 3/1998 | Matsuo et al. . |
| 5,737,115 | 4/1998 | Mackinlay et al. . |
| 5,738,977 | 4/1998 | Van Der Sluis-an Der Voort et al. . |
| 5,739,801 | 4/1998 | Sheridon . |
| 5,740,495 | 4/1998 | Maher et al. . |
| 5,744,283 | 4/1998 | Spierings et al. . |
| 5,750,238 | 5/1998 | Iijima et al. . |
| 5,751,433 | 5/1998 | Narendranath et al. . |
| 5,751,434 | 5/1998 | Narendranath et al. . |
| 5,752,152 | 5/1998 | Gasper et al. . |
| 5,783,856 | 7/1998 | Smith et al. . |
| 5,786,875 | 7/1998 | Brader et al. . |
| 5,824,186 | 10/1998 | Smith et al. . |
| 5,843,259 | 12/1998 | Narang et al. . |
| 5,904,545 | 5/1999 | Smith et al. . |
| 5,930,026 | 7/1999 | Jacobson et al. . |
| 5,936,259 | 8/1999 | Katz et al. . |
| 5,961,804 | 10/1999 | Jacobson et al. . |
| 5,969,376 | 10/1999 | Bao . |
| 5,989,945 * | 11/1999 | Yudasaka et al. .................... 257/347 |
| 6,005,791 | 12/1999 | Gudesen et al. . |
| 6,005,817 | 12/1999 | Gudesen et al. . |
| 6,172,878 * | 1/2001 | Takabayashi et al. ............... 361/760 |

FOREIGN PATENT DOCUMENTS

| | | |
|---|---|---|
| 1 314 906 | 4/1973 | (EP) . |
| 0 186 710 A1 | 7/1986 | (EP) . |
| 0 325 013 A1 | 7/1989 | (EP) . |
| 0 325 013 B1 | 7/1989 | (EP) . |
| 0 344 367 A1 | 12/1989 | (EP) . |
| 0 344 367 B1 | 12/1989 | (EP) . |
| 0 361 420 A2 | 4/1990 | (EP) . |
| 0 363 030 A2 | 4/1990 | (EP) . |
| 0 363 030 B1 | 4/1990 | (EP) . |
| 0 396 247 A2 | 11/1990 | (EP) . |
| 0 396 247 B1 | 11/1990 | (EP) . |
| 0 404 545 A2 | 12/1990 | (EP) . |
| 0 443 571 A2 | 8/1991 | (EP) . |
| 0 448 853 A1 | 10/1991 | (EP) . |
| 0 448 853 B1 | 10/1991 | (EP) . |
| 0 460 747 A2 | 12/1991 | (EP) . |

| | | |
|---|---|---|
| 0 525 852 A1 | 2/1993 | (EP) . |
| 0 525 852 B1 | 2/1993 | (EP) . |
| 0 570 995 A1 | 11/1993 | (EP) . |
| 0 570 995 B1 | 11/1993 | (EP) . |
| 0 575 475 B1 | 12/1993 | (EP) . |
| 0 586 373 B1 | 3/1994 | (EP) . |
| 0 586 545 B1 | 3/1994 | (EP) . |
| 0 595 812 B1 | 5/1994 | (EP) . |
| 0 601 072 B1 | 6/1994 | (EP) . |
| 0 601 075 B1 | 6/1994 | (EP) . |
| 0 604 423 B1 | 7/1994 | (EP) . |
| 0 618 715 A1 | 10/1994 | (EP) . |
| 0 684 579 A2 | 11/1995 | (EP) . |
| 0 924 551 A1 | 6/1999 | (EP) . |
| 2 693 005 | 12/1993 | (FR) . |
| 2 149 548 A | 6/1985 | (GB) . |
| 2 306 229 A | 4/1997 | (GB) . |
| 2 324 273 A | 10/1998 | (GB) . |
| 62058222 | 3/1987 | (JP) . |
| 62231930 | 10/1987 | (JP) . |
| 01086116 | 3/1989 | (JP) . |
| 64-86116 | 3/1989 | (JP) . |
| 6089081 | 3/1994 | (JP) . |
| 6-202168 | 7/1994 | (JP) . |
| 950181574 | 7/1995 | (JP) . |
| 9-6277 | 1/1997 | (JP) . |
| 9-185087 | 7/1997 | (JP) . |
| WO 92/12453 | 7/1992 | (WO) . |
| WO 92/17873 | 10/1992 | (WO) . |
| WO 92/20060 | 11/1992 | (WO) . |
| WO 92/21733 | 12/1992 | (WO) . |
| WO 93/02443 | 2/1993 | (WO) . |
| WO 93/04458 | 3/1993 | (WO) . |
| WO 93/04459 | 3/1993 | (WO) . |
| WO 93/05425 | 3/1993 | (WO) . |
| WO 93/07608 | 4/1993 | (WO) . |
| WO 93/17414 | 9/1993 | (WO) . |
| WO 93/18428 | 9/1993 | (WO) . |
| WO 95/05622 | 2/1995 | (WO) . |
| WO 95/06307 | 3/1995 | (WO) . |
| WO 95/07527 | 3/1995 | (WO) . |
| WO 95/10107 | 4/1995 | (WO) . |
| WO 95/22085 | 8/1995 | (WO) . |
| WO 96/41372 | 12/1996 | (WO) . |
| WO 97/01161 | 1/1997 | (WO) . |
| WO 97/01165 | 1/1997 | (WO) . |
| WO 97/01171 | 1/1997 | (WO) . |
| WO 97/04398 | 2/1997 | (WO) . |
| WO 97/24907 | 7/1997 | (WO) . |
| WO 97/35298 | 9/1997 | (WO) . |
| WO 97/48009 | 12/1997 | (WO) . |
| WO 97/49125 | 12/1997 | (WO) . |
| WO 98/03896 | 1/1998 | (WO) . |
| WO 98/19208 | 5/1998 | (WO) . |
| WO 98/41898 | 9/1998 | (WO) . |
| WO 98/55897 | 12/1998 | (WO) . |
| WO 98/58383 | 12/1998 | (WO) . |
| WO-99/ 03087-A2 * | 1/1999 | (WO) . |
| WO 99/10768 | 3/1999 | (WO) . |
| WO 99/12170 | 3/1999 | (WO) . |
| WO 99/20682 | 4/1999 | (WO) . |
| WO 99/26419 | 5/1999 | (WO) . |
| WO 99/40631 | 8/1999 | (WO) . |
| WO 99/41732 | 8/1999 | (WO) . |
| WO 99/41787 | 8/1999 | (WO) . |
| WO 99/41788 | 8/1999 | (WO) . |
| WO 99/44229 | 9/1999 | (WO) . |
| WO 99/45416 | 9/1999 | (WO) . |
| WO 99/45582 | 9/1999 | (WO) . |
| WO 99/47970 | 9/1999 | (WO) . |
| WO 99/53371 | 10/1999 | (WO) . |
| WO 00/56171 | 11/1999 | (WO) . |
| WO 99/63527 | 12/1999 | (WO) . |
| WO 99/65011 | 12/1999 | (WO) . |
| WO 99/65012 | 12/1999 | (WO) . |

OTHER PUBLICATIONS

Chiang et al., "A High Speed Electrophoretic Matrix Display," *SID 80 Digest*, 1980, pp. 114–115.

Dalisa, "Electrophoretic Display Technology," *Transactions on Electron Devices*, vol. 24, No. 7, Jul. 1977, pp. 827–834.

Hosaka et al., "Electromagnetic microrelays: concepts and fundamental characteristics," *Sensors and Actuators A*, vol. A40, No. 1, 1994, pp. 41–48.

Kornfeld, "A Defect–Tolerant Active–Matrix Electrophoretic Display," *SID 84 Digest*, 1984, pp. 142–144.

Moesner et al., "Devices for Particle Handling by an AC Electric Field," *1995 IEEE*, pp. 66–71.

Murau, "Characteristics of an X–Y Addressed Electrophorectic Image Display (EPID)," *SID 84 Digest*, 1984, p. 141.

Vaz et al., "Dual Frequency Addressing of Polymer–Dispensed Liquid–Crystal Films," *Journal of Applied Physics*, vol. 65, No. 12, Jun. 1989, pp. 5043–5050.

Ota et al., "Developments in Electrophoretic Displays," *Proceedings of the SID*, vol. 18, No. 3 & 4, 1977, pp. 243–254.

Ota et al., "Electrophoretic Display Devices", *Laser 75 Optoelectronics Conference Proceedings*, pp. 145–148.

Ota et al., "Electrophoretic Image Display (EPID) Panel", *Proceedings of the IEEE*, 1973, pp. 1–5.

Pankove, "Color Reflection Type Display Panel", *RCA Technical Notes*, No. 535, 1962, pp. 1–2.

Quon, "Multilevel Voltage Select (MLVS): A Novel Technique to X–Y Address an Electrophoretic Image Display," *Correspondence*, 1977, pp. 1120–1123.

Saitoh, M. et al., "A Newly Developed Electrical Twisting Ball Display,"*Proceedings of the SID*, vol. 23, No. 4, 1982, pp. 249–253.

Sheridon et al., "A Photoconductor–Addressed Electrophoretic Cell for Office Data Display,"*SID 82 Digest*, 1982, pp. 94–95.

Shiffman et al., "An Electrophoretic Image Display with Internal NMOS Address Logic and Display Drivers" *Proceedings of the SID*, vol. 25, No. 2, 1984, pp. 105–115.

Shiwa et al., "Electrophoretic Display Method Using Ionographic Technology" *SID 88 Digest*, 1988, pp. 61–62.

Singer et al., "An X–Y Addressable Electrophoretic Display" *Proceeding of the SID*, vol. 18, Nos. 3&4, 1977, pp. 255–266.

Vance, "Optical Characteristics of Electrophoretic Displays," *Proceedings of the SID*, vol. 18, Nos. 3 & 4, 1977, pp. 267–274.

Yamaguchi et al., "Equivalent Circuit of Ion Projection–Driven electrophoretic Display," IEICE Transaction, vol. 74, No. 12, 1991, pp. 4152–4156.

Negroponte et al., "Surfaces and Displays," *Wired*, Jan. 1997, p. 212.

Comiskey et al, "An Electrophoretic Ink for All–Printed Reflective Electronic Displays", *Nature*, vol. 394, Jul. 16, 1998, pp. 253–255.

Peterson, "Rethinking Ink. Printing the Pages of an Electronic Book," *Science News*, vol. 153, Jun. 20, 1998, pp. 396–397.

Guernsey, L., "Beyond Neon: Electronic Ink," New York Times, Jun. 3, 1999, pp. B11.

Hoppe et al, "An Electrophoretic Display, Its Propeties, ... and Addressing," *Transaction on Electron Devices*, vol. Ed–26, No. 8, Aug. 1979, pp. 1148–1152.

White, "An Electrophoretic Bar Graph Display," *Proceedings of the SID*, vol. 22 No. 3, 1981, pp. 173–180.

Antia, "Switchable Reflections Made Electronic Ink," *Science*, vol. 285, Jul. 30, 1999, pp. 658.

Chiang et al., "A Stylus Writable Electrophoretic Display Device," *SID 79 Digest*, 1979, pp. 44–45.

Nakamura et al., "Development of Electrophoretic Display Using Microcapsulated Suspension," *1998 SID*.

Ridley et al., "All–Inorganic Field Effect Transistors Fabricated By Printing," *Science*, vol. 286, Oct. 22, 1999, pp. 746–748.

Dabbousi et al, "Electroluminescence from CdSe quantum–dot/polymer composites," *Appl. Phys. Lett*, vol. 66, Nos. 11, Mar. 13, 1995, pp. 1316–1318.

Drzaic et al., "A Printed and Rollable Bistable Electronic Display," *1998 SID*, pp. 1–4.

Toyama et al., "An Electrophoretic Matrix Display with External Logic and Driver Directly Assembled to the Panel," 1994 SID, vol. 25, Jun. 14, 1994, pp. 588–590.

Jackson et al., "Organic Thin–Film Transistors for Organic Light–Emitting Flat–Panel Display Backplanes," 1998 SID, vol. 4, No. 1, Jan. 1, 1998, pp. 100–104.

\* cited by examiner

ASSEMBLY OF MICROENCAPSULATED ELECTRONIC DISPLAYS

RELATED APPLICATIONS

The present application claims priority to provisional application U.S. Ser. No. 60/112,330 filed on Dec. 15, 1998, the entire disclosure of which is incorporated herein by reference. The present application is a continuation-in-part of utility applications U.S. Ser. No. 09/338,412 filed on Jun. 22, 1999, now abandoned, and U.S. Ser. No. 09/289,036 filed on Apr. 9, 1999, the entire disclosures of which are incorporated herein by reference.

FIELD OF THE INVENTION

This invention generally relates to methods of manufacturing an electronic display, and more particularly, to methods of assembling electronic displays.

BACKGROUND OF THE INVENTION

An electronic display includes optical components such as liquid crystals and electrophoretic particles and electronic components such as electrodes and driving circuitry. The optical components and the electronic components have differing performance criteria. For example, it is desirable for the optical components to optimize reflectivity, contrast ratio and response time, while it is desirable for the electronic components to optimize conductivity, voltage-current relationship, and capacitance, or to possess memory, logic, or other higher-order electronic device capabilities. Therefore, a process for manufacturing an optical component may not be ideal for manufacturing an electronic component, and vice versa. For example, a process for manufacturing an electronic component can involve processing under high temperatures. The processing temperature can be in the range from about 300° C. to about 600° C. Subjecting many optical components to such high temperatures, however, can be harmful to the optical components by degrading the elements (i.e., the electrophoretic particles or liquid crystals) chemically or by causing mechanical damage.

SUMMARY OF THE INVENTION

One way to circumvent this problem is to change the chronology of display fabrication, in which the electronic components requiring high temperature processing are processed first, and the optical components requiring low temperature processing are processed second. Another way to circumvent this problem is to process the optical components and the electrical components separately and then integrate the two components, afterwards.

The present invention relates to a method of manufacturing an electro-optical device. In one aspect, the electro-optical device is manufactured in accordance with the following steps. First, a modulating layer, a pixel layer, and a circuit layer are provided. The modulating layer includes a first substrate and an electro-optical material provided adjacent the first substrate. The modulating layer is capable of changing a visual state upon application of an electric field. The pixel layer comprises a second substrate. A plurality of pixel electrodes are provided on a front surface of the second substrate and a plurality of contact pads are provided on a rear surface of the second substrate. Each pixel electrode is connected to a contact pad through a via extending through the second substrate. The circuit layer includes a third substrate and at least one circuit element. The modulating layer, the pixel layer, and the circuit layer are integrated to form the electro-optical device.

In one embodiment, the pixel layer and the modulating layer are integrated first to form a subassembly, and thereafter, the circuit layer and the subassembly are integrated to form the electro-optical device. For example, the pixel layer and the modulating layer can be integrated through encapsulation. Alternatively, an edge of the pixel layer and an edge of the modulating layer can be sealed together. The circuit layer and the subassembly can be integrated by bonding the two layers. For example, the circuit layer and the subassembly can be bonded by inserting an adhesive layer comprising an anisotropically conductive material between the two layers.

In another embodiment, the pixel layer and the circuit layer are integrated first to form a subassembly and thereafter, the modulating layer and the subassembly are integrated to form the electro-optical device.

In one embodiment, the electro-optical material comprises a plurality of capsules, each capsule comprising a plurality of particles dispersed in a fluid. For example, the plurality of particles can be electrophoretic particles. In another embodiment, the electro-optical material comprises liquid crystals. In still another embodiment, the electro-optical material comprises a plurality of capsules, each capsule comprising a bichromal sphere dispersed in a fluid.

In one embodiment, the modulating layer comprises a flexible substrate. For example, the modulating layer can be an organic substrate.

In one embodiment, the pixel layer comprises an insulative substrate. The pixel layer can be formed by printing or evaporating a conductive material on the front surface of the substrate to form the pixel electrodes.

In one embodiment, the circuit layer includes one or more of the following elements: a data line driver, a select line driver, a power supply, a sensor, a logic element, a memory device and a communication device. For example, the circuit layer can include non-linear devices such as transistors. The transistors can be made by printing organic-based field effect transistors on a front surface of the circuit layer.

In one embodiment, the modulating layer, the pixel layer, and the circuit layer are tested prior to being integrated.

In another aspect, the invention features an electro-optical device manufactured using the methods described herein. The electro-optical device can be an electronic display.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIG. 6b shows a cross-section of an electronic ink integrated using the method illustrated in FIG. 6a.

DETAILED DESCRIPTION OF PREFERRED EMBODIMENTS

Figure 1:
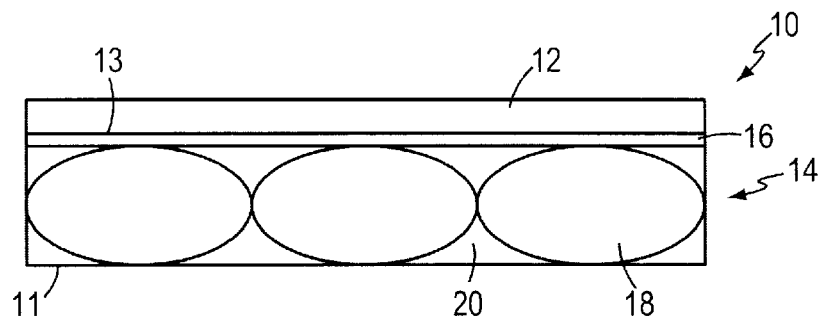
FIG. 1 shows a cross-section view of a modulating layer of an electronic display, according to one embodiment of the present invention.

The present invention relates to a method of assembling or packing an electronic display. Referring to FIG. 1, a modulating layer 10 prepared using methods to be described, which optimize the optical qualities of the modulating layer 10, is provided. The modulating layer 10 includes a substrate 12 and a display media 14 provided next to the substrate 12. The substrate 12 includes a front common electrode 16 deposited on a first surface 13 of the substrate 12 next to the display media 14. The display media 14 includes microcapsules 18 dispersed in a binder 20. Each microcapsule 18 includes an electro-optical material. An electro-optical material refers to a material which displays an optical property in response to an electrical signal. Examples of electro-optical material can be electrophoretic particles or a liquid crystalline fluid dispersed in a solvent. An electro-optical material can also be bichromal spheres dispersed in a solvent. Details of electro-optical materials within the microcapsules 18 will be discussed further in reference to FIGS. 8a–8d. An important property of the electro-optical material within the microcapsules 18 is that the material is capable of displaying one visual state upon application of an electric field and a different visual state upon application of a different electric field.

Figure 2:
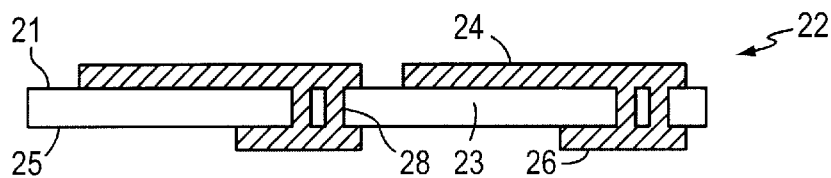
FIG. 2 shows a cross-section view of a pixel layer of an electronic display, according to one embodiment of the present invention.

Referring to FIG. 2, a pixel layer 22, prepared using methods to be discussed which optimize the electrical properties of the pixel layer 22, is provided. The pixel layer 22 includes a substrate 23, pixel electrodes 24 provided on a first surface 21 of the substrate 23, and contact pads 26 provided on a second surface 25 of the substrate 23. Each pixel electrode 24 is electrically connected to a contact pad 26 through a via 28. In order to maximize probability of electrical contact between the pixel electrode 24 and the contact pad 26, more than one via 28 can be provided between each pixel electrode 24 and its corresponding contact pad 26, as illustrated in FIG. 2. The pixel layer 22 will be discussed in detail with reference to FIGS. 9a and 9b.

Figure 3:
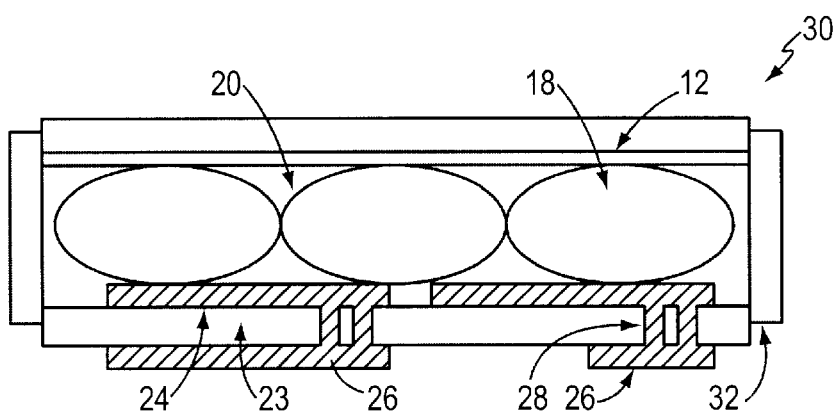
FIG. 3 shows a cross-section view of a subassembly of the modulating layer of FIG. 1 and the pixel layer of FIG. 2, according to one embodiment of the present invention.

The modulating layer 10 of FIG. 1 and the pixel layer 22 of FIG. 2, prepared separately are now integrated as illustrated in FIG. 3 to form a subassembly 30. The pixel electrodes 24 are brought in contact with a second surface 11 of the modulating layer 10 such that the common electrode 12 is provided next to the first surface 13 of the display media 14 and the pixel electrodes 24 are provided next to the second surface 11 of the display media 14. The pixel layer 22 can be joined with the modulating layer 10 by providing an adhesive material between the pixel layer 22 and the modulating layer 10. The adhesive material has electrical, mechanical, and chemical properties that are compatible with those of the pixel layer 22 and the modulating layer 10. To ensure intimate connection between the pixel layer 22 and the modulating layer 10, the subassembly 30 may be pressed together using standard pressing equipment well known to those skilled in the art, such as vacuum laminators and thermal presses.

The edges of the subassembly 30 can be sealed using a seal 32 as shown in FIG. 3. The material for the edge seal 32 can be selected from a number of commercially available materials, such as one or two-part epoxies. In another embodiment, the subassembly 30 is encapsulated in a protective material. The material for the encapsulant can be selected from a number of commercially available transparent materials, such as vapor-deposited parylene. In this embodiment, the contact pads 26 remain exposed to provide electrical connection with a circuit layer. Alternatively, encapsulation with a protective material can take place after a final assembly of an electronic display is provided. The protective material used for encapsulation protects the electro-optic material and the electronic elements from the environment.

Figure 4A:
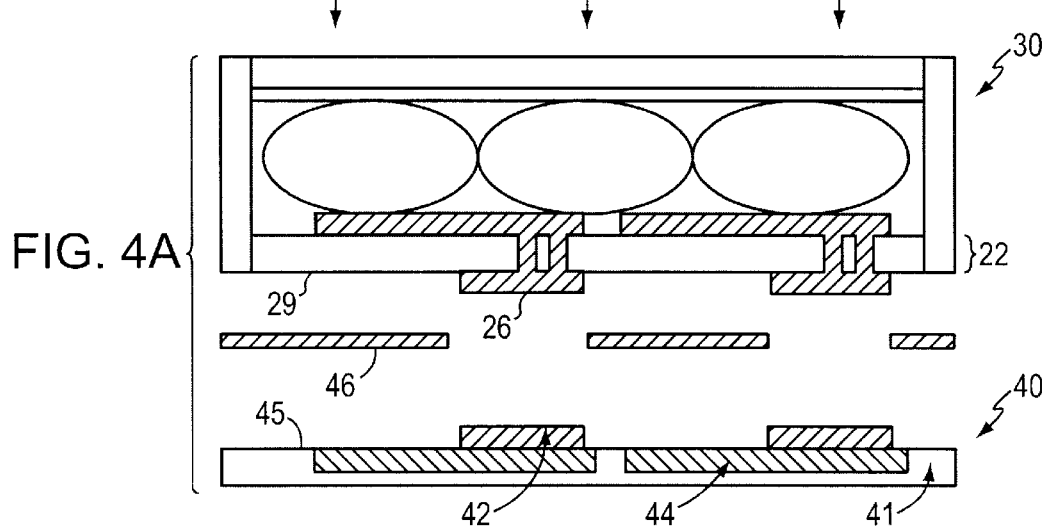
FIG. 4a illustrates integration of the subassembly of FIG. 3 and a circuit layer, according to one embodiment of the present invention.
Figure 4B:
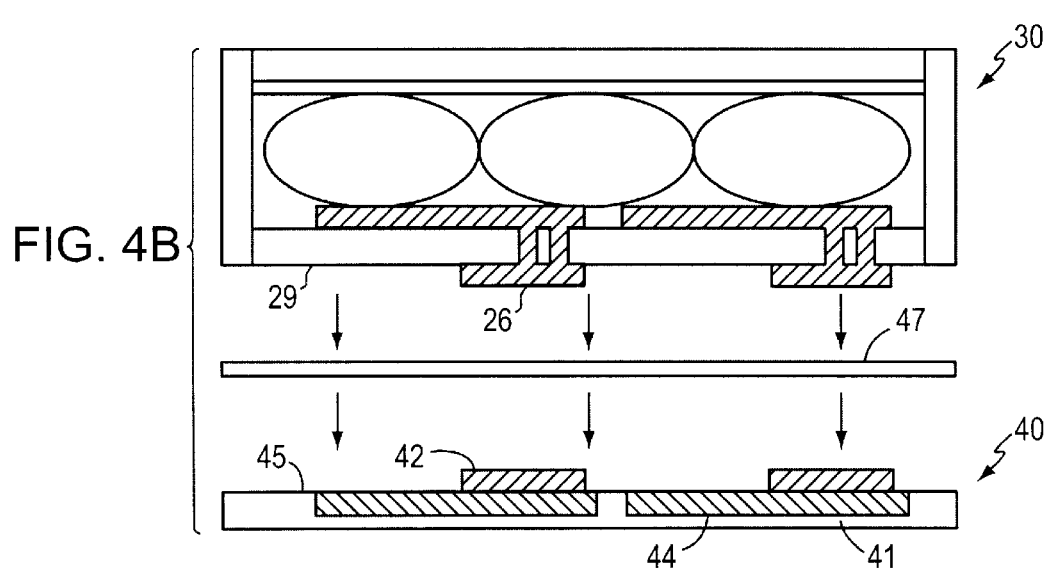
FIG. 4b illustrates integration of the subassembly of FIG. 3 and a circuit layer, according to another embodiment of the present invention.

Referring to FIGS. 4a and 4b, the subassembly 30 is integrated with the circuit layer 40. The circuit layer 40 includes a substrate 41, pixel electrode contacts 42 provided on a first surface 45 of the substrate 41 and pixel circuitry and logic 44 provided on the substrate 41. Details of the circuit layer 40 will be discussed in reference to FIGS. 10 and 11. In one embodiment, the subassembly 30 is bonded to the circuit layer 40 using bonding techniques known to those skilled in the art, such as thermocompression, thermosonic bonding or mechanical bonding.

In the embodiment of FIG. 4a, an adhesive layer 46 is provided between the second surface 25 of the pixel layer 22 of the subassembly 30 and a first surface 45 of the circuit layer 40. To improve adhesion and planarization, the adhesive layer 46 can be provided on the second surface 25 of the pixel layer 22 around the contact pads 26 and the first surface 45 of the circuit layer 30 around the pixel electrode contacts 42. The adhesive layer 46, for example, can be made of a film coated on both sides with an adhesive material. Examples of such adhesive layers include Double Coated Film Tape Nos. 9443, 443, and 444 available from 3M Company (St. Paul, Minn.). In one embodiment, the adhesive layer 46 is printed on the second surface 25 of the pixel layer 22 and/or the first surface 45 of the circuit layer 40.

In the embodiment of FIG. 4b, an anisotropic conductive film 47 is provided between the second surface 25 of the pixel layer 22 and the first surface 45 of the circuit layer 40. An anisotropic conductive film 47 is conductive through one axis, such as the z-axis only. The anisotropic conductive film 47 can consist of silver particles dispersed in an adhesive matrix such as Z-axis Adhesive Film Nos. 5303 and 7303 available from 3M Company (St. Paul, Minn.). The anisotropic conductive film 47 can provide the electrical feed through between the contact pads 26 and the pixel electrode contacts 42.

Figure 5:
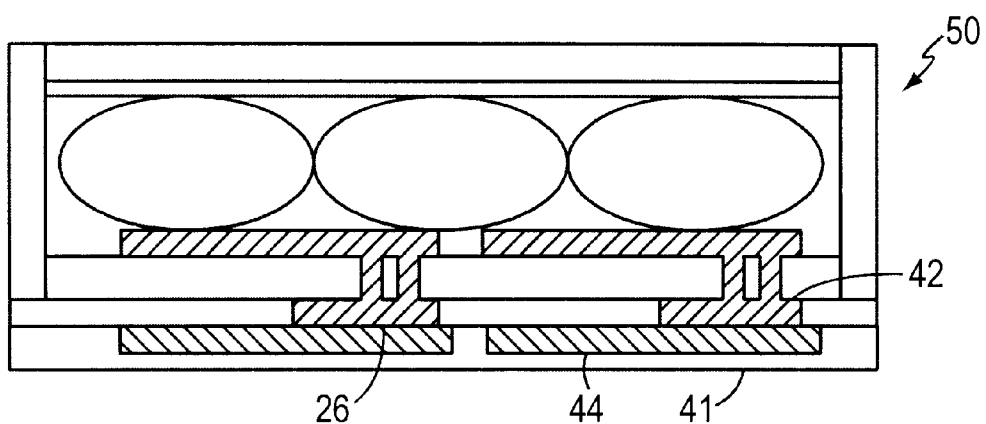
FIG. 5 shows a cross-section of an electronic ink assembly, according to one embodiment of the present invention.

After providing the adhesive layer 46, 47 between the pixel layer 22 and the circuit layer 30, a pressure is applied to the subassembly 30 and the circuit layer 40 to bond them together. Standard equipment known to those skilled in the art, such as vacuum laminators and thermal presses, can be used for assembling the subassembly 30 and the circuit layer 40 to form the assembly 50, as shown in FIG. 5. In one embodiment, the pixel layer 22 and the circuit layer 40 are connected through edge connectors in addition to the vias 28.

Figure 6A:
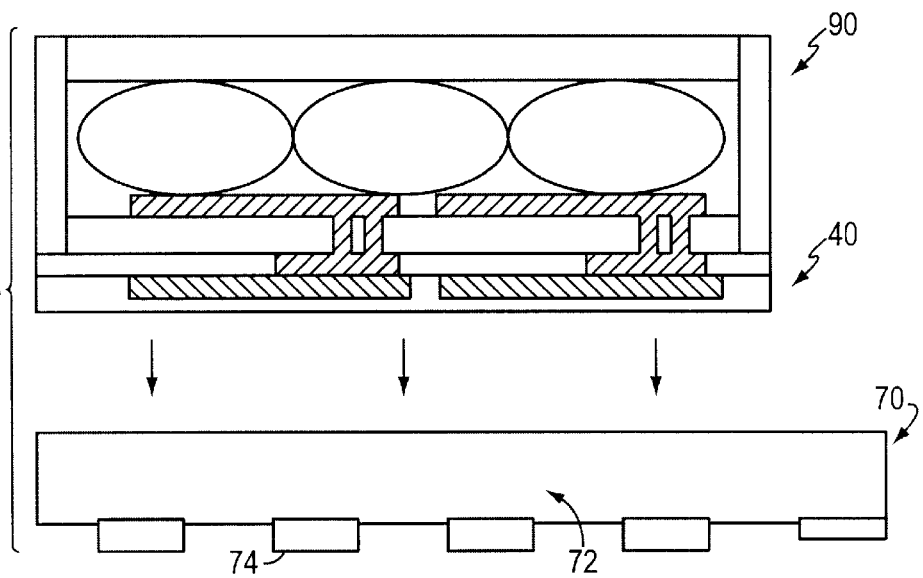
FIG. 6a illustrates integration of the electronic ink assembly of FIG. 5 and a second circuit layer, according to one embodiment of the present invention.
Figure 6B:
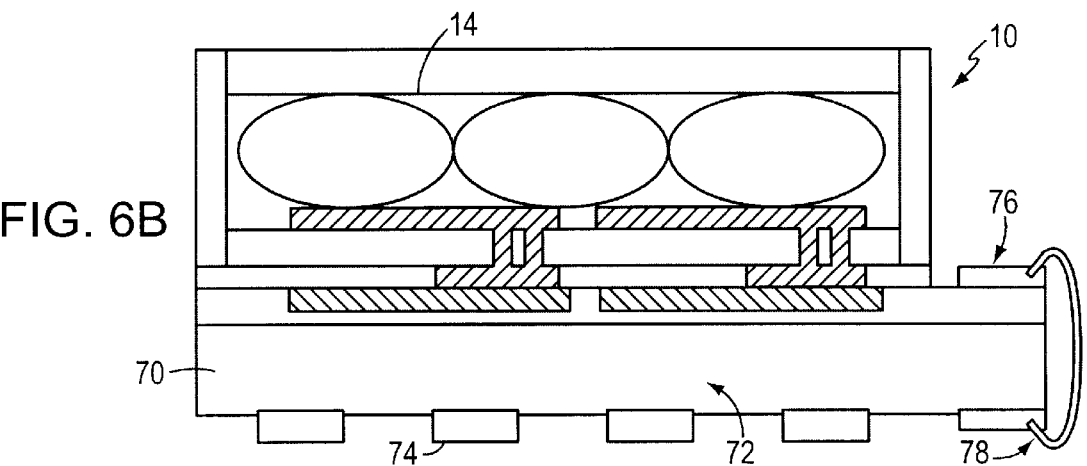

Referring to FIGS. 6a and 6b, the circuit layer 40 of the assembly 50 can be further connected to a second circuit layer 70. The second circuit layer 70 can include additional electronics for driving the electronic display. The second circuit layer 70 can include a flexible printed circuit board 72 and high performance integrated circuits 74 that perform control functions for the electronic display. The first circuit layer 40 and the second circuit layer 70 can be connected through a ribbon cable 78. The second circuit layer 70 can be used in addressing the display media 14. Alternatively, the second circuit layer 70 can be used in addressing a second display media provided next to the second circuit layer 70. In this embodiment, an electronic display includes two display surfaces.

Figure 7A:
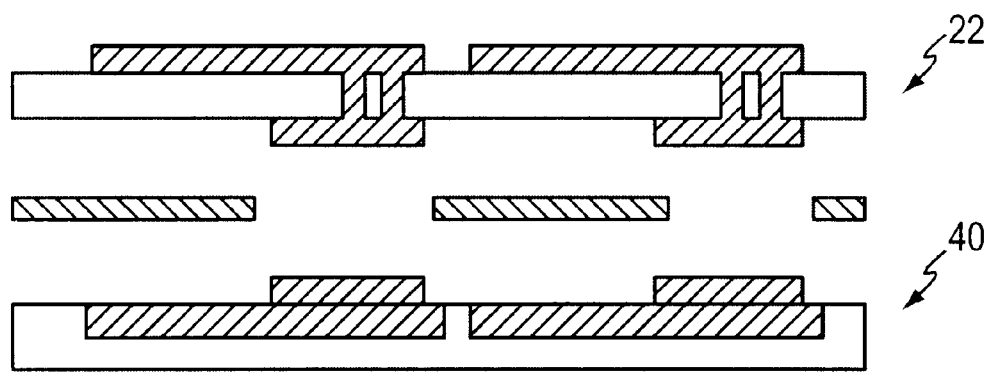
FIG. 7a illustrates integration of a pixel layer and a circuit layer to form a subassembly, according to one embodiment of the present invention.
Figure 7B:
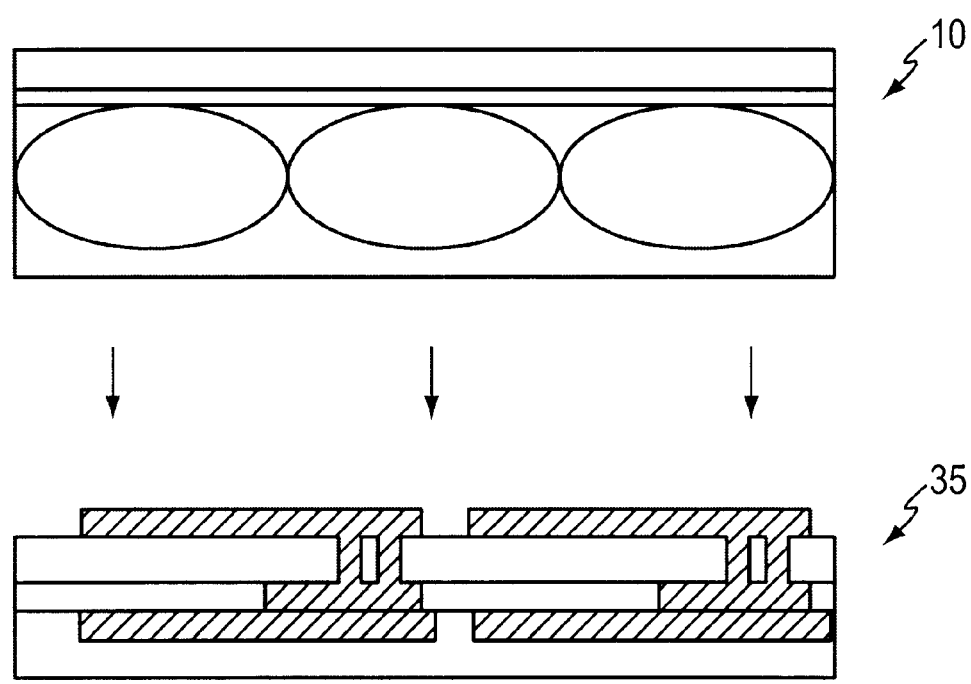
FIG. 7b illustrates integration of a subassembly of a pixel layer and a circuit layer to a modulator layer, according to one embodiment of the present invention.

The order of assembling the modulating layer 10, the pixel layer 22 and the circuit layer 40 is not limited to the order described in reference to FIGS. 1–3, 4a–4b, and 5. Referring to FIGS. 7a and 7b, the pixel layer 22 can be first laminated to the circuit layer 40, forming a subassembly 35, and subsequently the modulating layer 10 can be laminated to the subassembly 35. This order of assembling the modulating layer 10, the pixel layer 22 and the circuit layer 40 is desirable where the bonding pressure and temperature required to laminate the pixel layer 22 to the circuit layer 40 is outside the processing regime of the modulating layer 10.

The alignment of the modulating layer 10, the pixel layer 22 and the circuit layer 40 can be facilitated by mechanical and/or photographic alignment markers. For example, the alignment markers can be printed on the second surface 25 of the pixel layer 22 and the first surface 45 of the circuit layer 40 in precise locations, preferably at opposite corners on the pixel layers 22 and the circuit layer 40, and the relative positions of the pixel layer 22 and the circuit layer 44 layers can be adjusted until all markers are aligned. For a plastic or deformable substrate, an alignment feature can be embossed on one substrate and punched through the other substrate to provide an interlocking alignment joint.

The method of assembling the electronic display according to the present invention, allows each of the modulating layer, the pixel layer and the circuit layer to be processed individually to optimize its performance characteristics. In addition, each of the modulating layer, the pixel layer, and the circuit layer can be tested after processing prior to assembly. Such capability reduces cost of production. In one embodiment, a subassembly of the modulating layer and the pixel layer can be tested by simply contacting the subassembly with the circuit layer, prior to assembly.

In one embodiment, the display media used in forming the electronic display comprises a particle-based display media. In one detailed embodiment, the particle-based display media comprises an electronic ink. An electronic ink is an optoelectronically active material which comprises at least two phases: an electrophoretic contrast media phase and a coating/binding phase. The electrophoretic phase comprises, in some embodiments, a single species of electrophoretic particles dispersed in a clear or dyed medium, or more than one species of electrophoretic particles having distinct physical and electrical characteristics dispersed in a clear or dyed medium. In some embodiments the electrophoretic phase is encapsulated, that is, there is a capsule wall phase between the two phases. The coating/binding phase includes, in one embodiment, a polymer matrix that surrounds the electrophoretic phase. In this embodiment, the polymer in the polymeric binder is capable of being dried, crosslinked, or otherwise cured as in traditional inks, and therefore a printing process can be used to deposit the electronic ink onto a substrate.

The optical quality of an electronic ink is quite distinct from other electronic display materials. The most notable difference is that the electronic ink provides a high degree of both reflectance and contrast because it is pigment based (as are ordinary printing inks). The light scattered from the electronic ink comes from a very thin layer of pigment close to the top of the viewing surface. In this respect it resembles an ordinary, printed image. Also, electronic ink is easily viewed from a wide range of viewing angles in the same manner as a printed page, and such ink approximates a Lambertian contrast curve more closely than any other electronic display material. Since electronic ink can be printed, it can be included on the same surface with any other printed material, including traditional inks. Electronic ink can be made optically stable in all display configurations, that is, the ink can be set to a persistent optical state. Fabrication of a display by printing an electronic ink is particularly useful in low power applications because of this stability.

Electronic ink displays are novel in that they can be addressed by DC voltages and draw very little current. As such, the conductive leads and electrodes used to deliver the voltage to electronic ink displays can be of relatively high resistivity. The ability to use resistive conductors substantially widens the number and type of materials that can be used as conductors in electronic ink displays. In particular, the use of costly vacuum-sputtered indium tin oxide (ITO) conductors, a standard material in liquid crystal devices, is not required. Aside from cost savings, the replacement of ITO with other materials can provide benefits in appearance, processing capabilities (printed conductors), flexibility, and durability. Additionally, the printed electrodes are in contact only with a solid binder, not with a fluid layer (like liquid crystals). This means that some conductive materials, which would otherwise dissolve or be degraded by contact with liquid crystals, can be used in an electronic ink application. These include opaque metallic inks for the rear electrode (e.g., silver and graphite inks), as well as conductive transparent inks for either substrate. These conductive coatings include conducting or semiconducting colloids, examples of which are indium tin oxide and antimony-doped tin oxide. Organic conductors (polymeric conductors and molecular organic conductors) also may be used. Polymers include, but are not limited to, polyaniline and derivatives, polythiophene and derivatives, poly3,4-ethylenedioxythiophene (PEDOT) and derivatives, polypyrrole and derivatives, and polyphenylenevinylene (PPV) and derivatives. Organic molecular conductors include, but are not limited to, derivatives of naphthalene, phthalocyanine, and pentacene. Polymer layers can be made thinner and more transparent than with traditional displays because conductivity requirements are not as stringent.

Figure 8A:
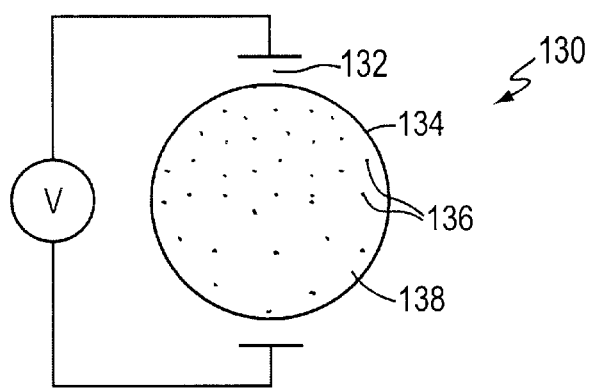
FIG. 8a shows a partial cross-section view of an electronic display media, according to one embodiment of the present invention.

FIG. 8a shows an electrophoretic display 130. The binder 132 includes at least one capsule 134, which is filled with a plurality of particles 136 and a dyed suspending fluid 138. In one embodiment, the particles 136 are titania particles. When a direct-current electric field of the appropriate polarity is applied across the capsule 134, the particles 136 move to the viewed surface of the display and scatter light. When the applied electric field is reversed, the particles 136 move to the rear surface of the display and the viewed surface of the display then appears dark.

Figure 8B:
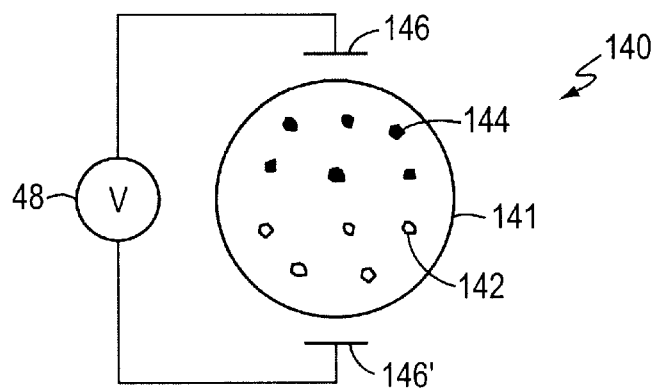
FIG. 8b shows a partial cross-section view of an electronic display media, according to one embodiment of the present invention.

FIG. 8b shows another electrophoretic display 140. This display comprises a first set of particles 142 and a second set of particles 144 in a capsule 141. The first set of particles 142 and the second set of particles 144 have contrasting optical properties. For example, the first set of particles 142 and the second set of particles 144 can have differing electrophoretic mobilities. In addition, the first set of particles 142 and the second set of particles 144 can have contrasting colors. For example, the first set of particles 142 can be white, while the second set of particles 144 can be black. The capsule 141 further includes a substantially clear fluid. The capsule 141 has electrodes 146 and 146' disposed adjacent it. The electrodes 146, 146' are connected to a source of voltage 148, which may provide an alternating-current (AC) field or a direct-current (DC) field to the capsule 441. Upon application of an electric field across the electrodes 146, 146', the first set of particles 142 move toward electrode 146', while the second set of particles 144 move toward electrode 146.

Figure 8C:
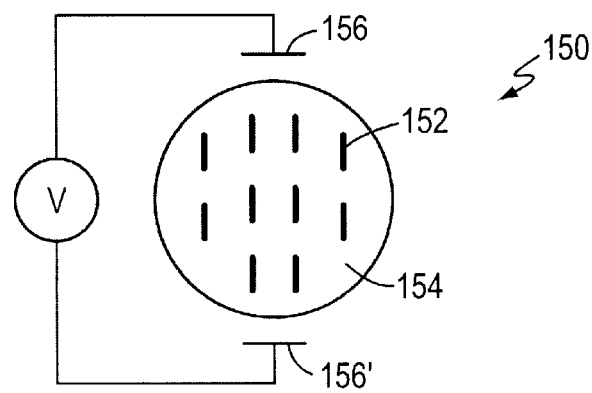
FIG. 8c shows a partial cross-section view of an electronic display media, according to one embodiment of the present invention.

FIG. 8c shows a suspended particle display 150. The suspended particle display 150 includes needle-like particles 152 in a transparent fluid 154. The particles 152 change their orientation upon application of an AC field across the electrodes 156, 156'. When the AC field is applied, the particles 152 are oriented perpendicular with respect to the display surface and the display appears transparent. When the AC field is removed, the particles 152 are randomly oriented and the display 150 appears opaque.

The electrophoretic displays provided in FIGS. 8a–8c are exemplary only, and other electrophoretic displays can be used in accordance with the present invention. Other examples of electrophoretic displays are described in commonly owned, copending U.S. patent application Ser. Nos. 08/935,800 and 09/140,792 which are incorporated herein by reference.

The successful construction of an encapsulated electrophoretic display requires the proper interaction of a binder for binding the capsules to a substrate, electrophoretic particles, fluid (for example, to surround the electrophoretic particles and provide a medium for migration), and a capsule membrane (for example, for enclosing the electrophoretic particles and fluid). These components must all be chemically compatible. The capsule membranes may engage in useful surface interactions with the electrophoretic particles, or may act as an inert physical boundary between the fluid and the binder. Polymer binders may set as adhesives between capsule membranes and electrode surfaces.

Various materials may be used to create electrophoretic displays. Selection of these materials is based on the functional constituents of the display to be manufactured. Such functional constituents include, but are not limited to, particles, dyes, suspending fluids, stabilizing/charging additives, and binders. In one embodiment, types of particles that may be used to fabricate suspended particle displays include scattering pigments, absorbing pigments and luminescent particles. Such particles may also be transparent. Exemplary particles include titania, which may be coated in one or two layers with a metal oxide, such as aluminum oxide or silicon oxide, for example. Such particles may be constructed as corner cubes. Luminescent particles may include, for example, zinc sulfide particles. The zinc sulfide particles may also be encapsulated with an insulative coating to reduce electrical conduction. Light-blocking or absorbing particles may include, for example, dyes or pigments. Types of dyes for use in electrophoretic displays are commonly known in the art. Useful dyes are typically soluble in the suspending fluid, and may further be part of a polymeric chain. Dyes may be polymerized by thermal, photochemical, and chemical diffusion processes. Single dyes or mixtures of dyes may also be used.

A suspending (i.e., electrophoretic) fluid may be a high resistivity fluid. The suspending fluid may be a single fluid, or it may be a mixture of two or more fluids. The suspending fluid, whether a single fluid or a mixture of fluids, may have its density substantially matched to that of the particles within the capsule. The suspending fluid may be halogenated hydrocarbon, such as tetrachloroethylene, for example. The halogenated hydrocarbon may also be a low molecular weight polymer. One such low molecular weight polymer is poly(chlorotrifluoroethylene). The degree of polymerization for this polymer may be from about 2 to about 10.

Furthermore, capsules may be formed in, or later dispersed in, a binder. Materials for use as binders include water-soluble polymers, water-dispersed polymers, oil-soluble polymers, thermoset polymers, thermoplastic polymers, and UV- or radiation-cured polymers.

While the examples described here are listed using encapsulated electrophoretic displays, there are other particle-based display media that also should work well, including encapsulated suspended particles and rotating ball displays. Other display media, such as liquid crystals and magnetic particles, also can be useful.

In some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two bounding electrodes. This binder material must be compatible with the capsule and bounding electrodes and must possess properties that allow for facile printing or coating. It may also possess barrier properties for water, oxygen, ultraviolet light, the electrophoretic fluid, or other materials. Further, it may contain surfactants and cross-linking agents, which could aid in coating or durability. The polymer-dispersed electrophoretic display may be of the emulsion or phase separation type.

Figure 8D:
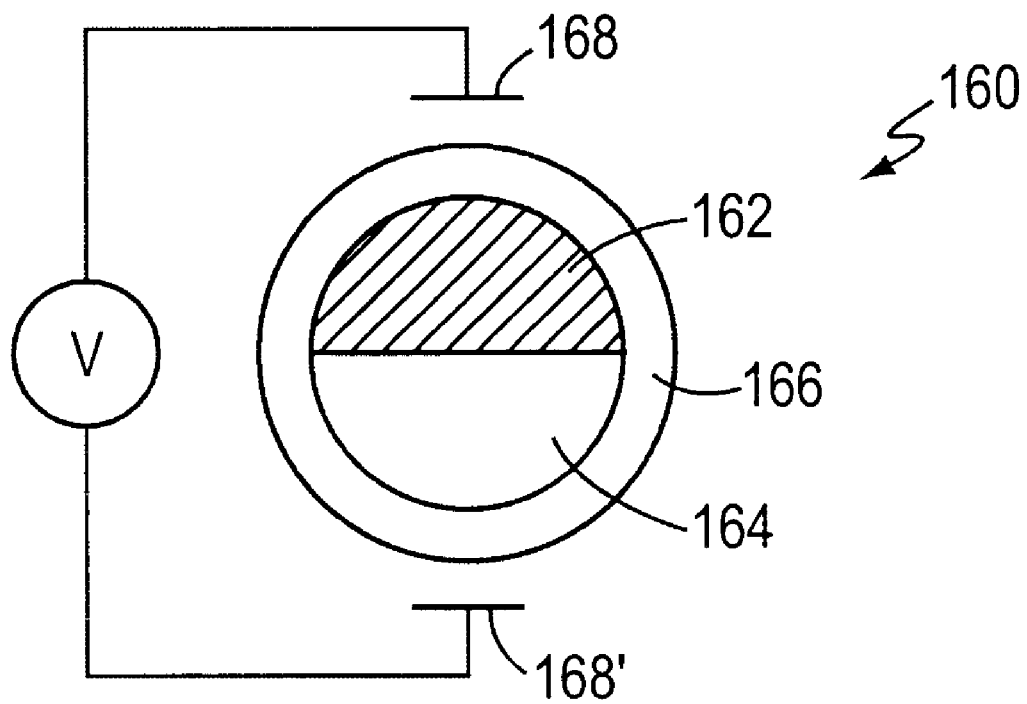
FIG. 8d shows a partial cross-section view of an electronic display media, according to one embodiment of the present invention.

In another detailed embodiment, the display media can comprise a plurality of bichromal spheres shown in FIG. 8d.

A bichromal sphere 160 typically comprises a positively charged hemisphere 162 of a first color and a negatively charged hemisphere 164 of a second color in a liquid medium 166. Upon application of an electric field across the sphere 160 through a pair of electrodes 168, 168', the sphere 160 rotates and displays the color of one of the two hemispheres 162, 164.

In one embodiment, an electronic display is created by printing the entire display or a portion of the display. The term "printing" is intended to include all forms of printing and coating, including: inkjet printing, premetered coating such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; screen printing processes; electrostatic printing processes; thermal printing processes; and other similar techniques.

Figures 9A, 9B:
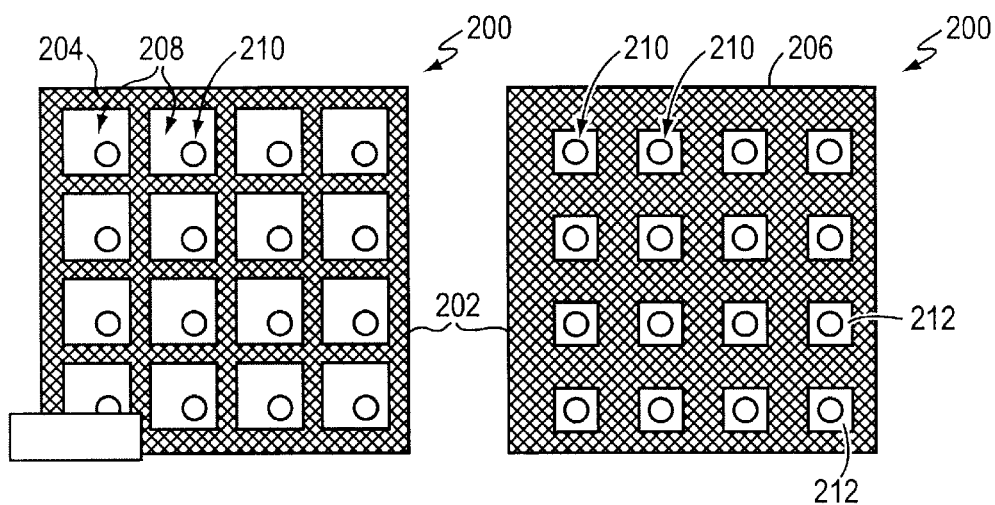
FIG. 9a shows a first surface of a pixel layer, according to one embodiment of the present invention.
FIG. 9b shows a second surface of a pixel layer, according to one embodiment of the present invention.

Referring to FIGS. 9a and 9b, the pixel layer 200 is described in more detail. The pixel layer 200 includes a substrate 202 having a first surface 204 and a second surface 206. The substrate 202, for example, can be made of an insulating polymeric material such as polyethylene terephthalate (PET, polyester), polyethersulphone (PES), polyimid film (e.g. Kapton, available from Dupont [Wilington, Del.]; Upilex, available from Ube Corporation [Japan]), or polycarbonate. An advantage of the insulator substrate 202 is that the substrate 202 protects the display media, as well as the pixel electrodes 208 from the environment. An array of pixel electrodes 208 are provided on the first surface 204 of the substrate 202. The pixel electrodes 208 are arranged in a manner to obtain high aperture ratio or fill factor. An electrically conductive material can be evaporated or printed on the first surface 204 of the substrate 202 to form the pixel electrodes 208. The pixel electrodes 208 are connected to the second surface 206 of the substrate 202 through electrical vias 210. The electrical vias 210 can be formed using one of several techniques. For example, holes can be made in the pixel layer 200 by either laser drilling, etching or pricking the holes. The holes are then filled by printing a low resistivity slurry such as carbon, graphite, or silver particles in a polymeric compound. An array of contact pads 212 are provided on the second surface 206 of the pixel layer 200. The contact pads 212 can be made using one of many available methods known to those skilled in the art. For example, a conductive material can be evaporated or printed on the second surface 206 of the substrate 202 to form the contact pads 212.

The pixel layer can be further processed to include various electrical, thermal and optical layers to improve display performance. For example, thermoelectric (TE) heaters or coolers can be provided on either surface of the substrate 202, as permitted by space availability, to ensure that the electro-optical material stays within its thermal operating regime. Thermoelectric heaters may be integrated by providing traces of resistive material on a surface of the substrate 202. By passing an electrical current through these traces, the display temperature can be regulated. Conversely, thermoelectric coolers, such as a Peltier cooler, can be used to move thermal energy from the display to a suitable heat sink.

The pixel layer can also include grounded thin metal foils and/or reflective or opaque light shields. Grounded thin-metal foils or light shields can be used to enhance the optical performance of the display and optically shield photosensitive microelectronics from light. For example, the pixel layer or the circuit layer may incorporate semiconducting materials, many of which are known to be photosensitive. Thin foils or light shields may be incorporated onto one or more surfaces of the pixel layer or the circuit layer so that the photosensitive materials are optically shielded from all incident light.

The circuit layer can include electrodes such as column electrodes and row electrodes, non-linear devices, and logic or driver circuitry for addressing the display. For example, the circuit layer can include transistors shown in FIGS. 10 and 11.

Figure 10:
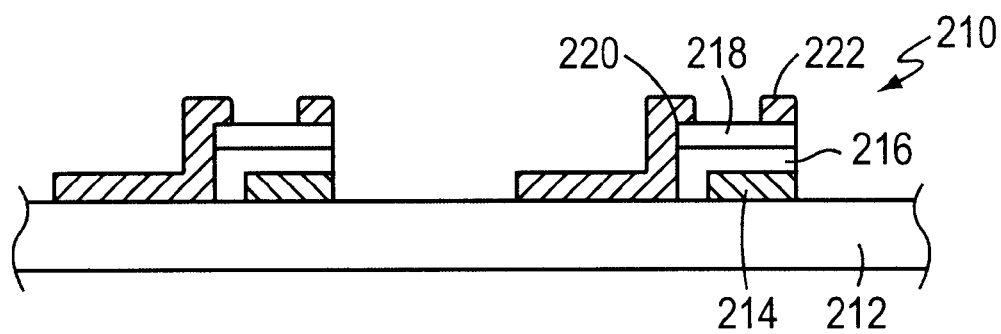
FIG. 10 shows a partial cross-section view of transistors for addressing an electronic display, according to one embodiment of the present invention.

Referring to FIG. 10, an organic-based field effect transistor 210 includes a substrate 212, a gate electrode 214 provided on the substrate 212, a dielectric layer 216 provided on the gate electrode 214, an organic semiconductor 218 provided on the dielectric layer 216, and a source electrode 220 and a drain electrode 222 provided on the organic semiconductor 218. The transistor 210 is electrically connected to a pixel electrode 200, a column electrode 204 and a row electrode 206. The pixel electrode 200 is connected to the drain electrode of the transistor 210. The column electrode 204 is connected to the source electrode of the transistor 210.

The substrate 212 can be flexible. For example, the substrate 212 can be made of a polymer, such as polyethylene terephthalate (PET, polyester), polyethersulphone (PES), polyimide film (Kapton, Upilex), or polycarbonate. Alternatively, the substrate 212 can be made of an insulator such as undoped silicon, glass, or other plastic. The substrate 212 can also be patterned to serve as an electrode. Alternatively, the substrate 212 can be a metal foil insulated from the gate electrode 214 by a non-conducting material. The gate electrode 214, the source electrode 220, and the drain electrode 222, for example, can comprise a metal such as gold. Alternatively, the electrodes 214, 220, 222 can comprise a conductive polymer such as polythiophene or polyaniline, a printed conductor such as a polymer film comprising metal particles such as silver or nickel, a printed conductor comprising a polymer film containing graphite or some other conductive carbon material, or a conductive oxide such as tin oxide or indium tin oxide, or metal electrodes such as aluminum or gold.

The dielectric layer 216, for example, can comprise a silicon dioxide layer. Alternatively, the dielectric layer 216 can comprise an insulating polymer such as polyimide and its derivatives or poly-vinyl phenol, polymethylmethacrylate, polyvinyldenedifluoride, an inorganic oxide such as metal oxide, an inorganic nitride such as silicon nitride, or an inorganic/organic composite material such as an organic-substituted silicon oxide, of a sol-gel organosilicon glass. The dielectric layer 216 can also comprise a benzocyclobutene (BCB) derivative marketed by Dow Chemical (Midland, Mich.), spin-on glass, or dispersions of dielectric colloid materials in a binder or solvent.

The semiconductor layer 218 can be an organic polymer. In one embodiment, the organic semiconductor comprises a polymeric or oligomeric semiconductor. Examples of suitable polymeric semiconductors include, but are not limited to, polythiophene, poly(3-alkyl), alkyl-substituted oligothiophene, polythienylenevinylene, poly(para-phenylenevinylene) and doped versions of these polymers. An example of suitable oligomeric semiconductor is alpha-hexathienylene. Horowitz, *Organic Field-Effect Transistors*, Adv. Mater., 10, No. 5, p. 365 (1998) describes the use of unsubstituted and alkyl-substituted oligothiophenes in transistors. A field effect transistor made with regioregular poly(3-hexylthiophene) as the semiconductor layer is described in Bao et al., *Soluble and Processable Regioregular Poly(3-hexylthiophene) for Thin Film Field-Effect Transistor Applications with High Mobility,* Appl. Phys. Lett. 69 (26), p. 4108 (December 1996). A field effect transistor made with α-hexathienylene is described in U.S. Pat. No. 5,659,181.

In another embodiment, the organic semiconductor 218 comprises a carbon based compound. Examples of suitable carbon based compounds include, but are not limited to, pentacene, phthalocyanine, benzodithiophene, fullerene, buckminsterfullerene, tetracyanonaphthoquinone, and tetrakisimethylanimoethylene. The materials provided above for forming the substrate, the dielectric layer, the electrodes, or the semiconductor layer are exemplary only. Other suitable materials known to those skilled in the art having properties similar to those described above can be used in accordance with the present invention.

Figure 11:
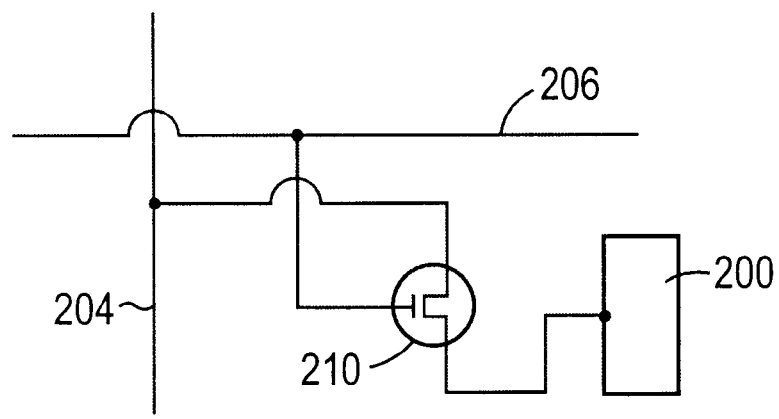
FIG. 11 illustrates a connection between a transistor and electrodes of an electronic display, according to one embodiment of the present invention.

The field effect transistor configuration provided in FIGS. 10 and 11 are exemplary only. Other transistor designs known to those skilled in the art can be used in accordance with the present invention. For example, a top gate structure in which the source and drain electrodes are placed adjacent the substrate, covered by the dielectric layer, which in turn is covered by the semiconductor and gate electrode, can also be used in accordance with the present invention.

According to the present invention, electrodes, non-linear devices such as the transistors of FIGS. 10 and 11, and logic and driving circuitry can be manufactured using any appropriate fabrication process known to those skilled in the art including, but not limited to, deposition, evaporation, lithography, printing, and coating. For example, an entire transistor that is organic-based can be printed in its entirety as described in co-pending commonly owned U.S. patent application Ser. No. 09/289,036, incorporated herein by reference. In another example, a transistor can be fabricated on a first substrate and subsequently removed and provided on a substrate of the circuit layer as described in co-pending commonly owned U.S. patent application Ser. No. 09/338,412, incorporated herein by reference.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of manufacturing an electro-optical device comprising:
   a) providing a modulating layer comprising a first substrate and an electro-optical material provided adjacent the first substrate, the modulating layer being capable of changing a visual state upon application of an electric field;
   b) providing a pixel layer comprising a second substrate, a plurality of pixel electrodes provided on a front surface of the second substrate and a plurality of contact pads provided on a rear surface of the second substrate, each pixel electrode connected to a contact pad through a via extending through the second substrate;
   c) providing a circuit layer comprising a third substrate and at least one circuit element; and
   d) laminating the modulating layer, the pixel layer and the circuit layer to form the electro-optical device.

2. The method of claim 1 wherein step d) comprises d1) laminating the pixel layer and the modulating layer to form a subassembly and d2) laminating the circuit layer and the subassembly, thereby forming the electro-optical device.

3. The method of claim 1 wherein the electro-optical material comprises a plurality of capsules, each capsule comprising a plurality of particles dispersed in a fluid.

4. The method of claim 3 wherein the plurality of particles comprises electrophoretic particles.

5. The method of claim 1 wherein the electro-optical material comprises liquid crystals.

6. The method of claim 1 wherein the electro-optical material comprises a plurality of capsules, each capsule comprising a bichromal sphere dispersed in a fluid.

7. The method of claim 1 wherein the modulating layer comprises a flexible first substrate.

8. The method of claim 1 wherein the modulating layer comprises an organic first substrate.

9. The method of claim 1 wherein the modulating layer comprises a first substrate and a transparent common electrode provided on the first substrate.

10. The method of claim 1 wherein the pixel layer comprises a second insulative substrate.

11. The method of claim 1 further comprising forming the pixel layer by printing a conductive material on the front surface of the second substrate to form the pixel electrodes.

12. The method of claim 1 further comprising forming the pixel layer by evaporating a conductive material on the front surface of the second substrate to form the pixel electrodes.

13. The method of claim 1 wherein step d) comprises d1) integrating the pixel layer and the modulating layer to form a subassembly and d2) integrating the circuit layer and the subassembly, thereby forming the electro-optical device.

14. The method of claim 2 wherein step d1) comprises encapsulating the pixel layer and the modulating layer.

15. The method of claim 2 wherein step d1) comprises sealing together an edge of the pixel layer and an edge of the modulating layer.

16. The method of claim 13 wherein step d1) comprises laminating the pixel layer and the modulating layer by providing the front surface of the pixel layer adjacent the electro-optical material of the modulating layer.

17. The method of claim 2 wherein step d2) comprises bonding the circuit substrate layer and the subassembly.

18. The method of claim 2 wherein step d1) comprises inserting an adhesive layer between the pixel layer and modulating layer.

19. The method of claim 2 wherein step d2) comprises bonding the circuit layer to the rear surface of the pixel layer.

20. The method of claim 19 wherein step d2) comprises bonding the circuit layer and the subassembly through one of thermocompression, thermosonic bonding and mechanical bonding.

21. The method of claim 19 wherein step d2) comprises bonding the circuit layer and the subassembly by inserting an adhesive between the circuit layer and the subassembly.

22. The method of claim 21 wherein step d2) comprises inserting an adhesive layer comprising an anisotropically conductive material between the circuit layer and the subassembly.

23. The method of claim 2 further comprising printing an adhesive layer adjacent the rear surface of the pixel layer around the contact pads prior to performing step d2).

24. The method of claim 13 wherein step a) comprises providing a first modulating layer and a second modulating layer, step b) comprises providing a first pixel layer and a second pixel layer, step d1) comprises laminating the first pixel layer and the first modulating layer to form a first assembly and laminating the second pixel layer and the second modulating layer to form a second assembly, and step d2) comprises placing the circuit layer between the first assembly and the second assembly.

25. The method of claim 13 wherein the circuit layer comprises a plurality of contacts provided on a front surface of the third substrate and step d2) comprises laminating the modulating layer and the subassembly such that a contact of the circuit layer is provided adjacent the contact pad of the pixel layer.

26. An electro-optical device manufactured by the method of claim 13.

27. The method of claim 1 wherein step d) comprises d1) laminating the pixel layer and the circuit layer to form a subassembly and d2) laminating the modulating layer and the subassembly to form the electro-optical device.

28. An electro-optical device manufactured by the method of claim 27.

29. The method of claim 1 wherein the circuit layer comprises at least one of a data line driver, a select line driver, a power supply, a sensor, a logic element, a memory device, and a communication device.

30. The method of claim 1 further comprising testing the modulating layer and the circuit layer prior to performing step d).

31. The method of claim 1 wherein the circuit layer comprises a plurality of non-linear devices.

32. The method of claim 1 wherein the circuit layer comprises a plurality of organic-based field effect transistors.

33. The method of claim 1 further comprising printing an organic-based field effect transistor array on a front surface of the third substrate of the circuit layer.

34. A method of manufacturing an electro-optical device comprising:

providing a modulating layer comprising a first substrate and an electro-optical material provided adjacent the first substrate, the modulating layer being capable of changing a visual state upon application of an electric field;

providing a pixel layer comprising a second substrate, a plurality of pixel electrodes provided on a front surface of the second substrate and a plurality of contact pads provided on a rear surface of the second substrate, each pixel electrode connected to a contact pad through a via extending through the second substrate;

providing a plurality of via holes through the second substrate and filling the via holes with a conductive material;

providing a circuit layer comprising a third substrate and at least one circuit element; and integrating the modulating layer, the pixel layer and the circuit layer to form the electro-optical device.

* * * * *